US009357251B2

(12) United States Patent
Dove et al.

(10) Patent No.: US 9,357,251 B2
(45) Date of Patent: May 31, 2016

(54) THOUGHT CONTROL OF SET TOP BOX (75) Inventors: Antony Michael Dove, Bradford (GB); Andrew Hey, Keighley (GB)

(73) Assignee: ECHOSTAR UK HOLDINGS LIMITED (GB)

( * ) Notice: Subject to any disclaimer, the term of this patent is extended or adjusted under 35 U.S.C. 154(b) by 796 days.

(21) Appl. No.: 12/903,058

(22) Filed: Oct. 12, 2010

(65) Prior Publication Data

US 2012/0090003 A1    Apr. 12, 2012

(51) Int. Cl.
*G06F 3/00*      (2006.01)
*G06F 13/00*     (2006.01)
*H04N 5/445*     (2011.01)
*H04N 21/422*    (2011.01)
*G06F 3/01*      (2006.01)

(52) U.S. Cl.
CPC .......... *H04N 21/42201* (2013.01); *G06F 3/015* (2013.01)

(58) Field of Classification Search
CPC ........................ H04N 21/422201; G06F 3/015
USPC ............ 725/10, 12, 38, 52, 56; 600/544, 545
See application file for complete search history.

(56) References Cited

U.S. PATENT DOCUMENTS

| 5,840,040 | A  | * | 11/1998 | Altschuler et al. | ............ 600/545 |
|---|---|---|---|---|---|
| 6,636,763 | B1 | * | 10/2003 | Junker et al. | ................... 600/545 |
| 6,952,809 | B2 | * | 10/2005 | Beranek et al. | ............... 715/856 |
| 7,127,283 | B2 | * | 10/2006 | Kageyama | ..................... 600/544 |
| 2006/0101079 | A1 | * | 5/2006 | Morikawa et al. | ......... 707/104.1 |
| 2009/0147148 | A1 | * | 6/2009 | Morikawa et al. | ............ 348/734 |
| 2009/0270753 | A1 | * | 10/2009 | Adachi et al. | ................. 600/544 |
| 2010/0010365 | A1 | * | 1/2010 | Terao et al. | ................... 600/544 |

* cited by examiner

*Primary Examiner* — Hunter B Lonsberry
*Assistant Examiner* — Patrick A Ryan
(74) *Attorney, Agent, or Firm* — Kilpatrick Townsend & Stockton LLP (57) ABSTRACT

Disclosure is directed to commanding a content receiver by interpreting brainwave patterns that are captured from a user of the content receiver. The user's brainwave patterns may be captured by the use of a headset having a plurality of sensors that are disposed at various locations in proximity to the user's head. The content receiver may be operable to learn to recognize specific brainwave patterns for individual users. The content receiver may recognize a number of specific brainwave patterns for each user, each specific brainwave pattern corresponding to a specific command that is executable by the content receiver. When executing user commands, the content receiver may process an input stream from the headset and compare portions of the input stream to the recognized brainwave patterns in order to extract commands from the input stream. Following this, the extracted commands may be executed by the content receiver.

21 Claims, 7 Drawing Sheets

THOUGHT CONTROL OF SET TOP BOX

TECHNICAL FIELD

Embodiments discussed herein are directed to commanding a content receiver by interpreting brainwave patterns that are captured from a user of the content receiver.

BACKGROUND

Program services, such as cable and satellite television, may be provided through systems that interact with a remote control or other user input device. The remote control is typically a hand-held device that includes a number of buttons. By pressing buttons on the remote control, a user is able to enter commands that are transmitted to a content receiver through a radio frequency (RF) signal, an infrared (IR) signal, or other suitable communication frequency. The commands transmitted to the content receiver may include, for example: a channel change command, a volume change command, a power on/off command, and so on. Generally, the remote allows a user to command the content receiver at a distance. In this way, the user may remain in a comfortable location while watching a program service without having to move each time he wants to command the content receiver.

The advantages provided by a hand-held remote controls may not be available to individuals with certain impairments. For example, those who suffer paralysis may be unable to physically manipulate a remote control. For others, such as those who suffer from arthritis, physically manipulating a remote control device may be difficult and painful. Accordingly, it may be desirable to provide a mechanism of providing input to a content receiver that may operated without the need for physically manipulating a hand-held device.

SUMMARY

Embodiments discussed herein are directed to commanding a content receiver by interpreting brainwave patterns that are captured from a user of the content receiver. The user's brainwave patterns may be captured by the use of a headset having a plurality of sensors that are disposed at various locations in proximity to the user's head. The content receiver may be operable to learn to recognize specific brainwave patterns for individual users. The content receiver may recognize a number of specific brainwave patterns for each user, each specific brainwave pattern corresponding to a specific command that is executable by the content receiver. When executing user commands, the content receiver may process an input stream from the headset and compare portions of the input stream to the recognized brainwave patterns in order to extract commands from the input stream. Following this, the extracted commands may be executed by the content receiver.

One embodiment is directed to a content receiver, comprising: a signal receiver operable to receive a content transmission from a service provider, the content transmission having a plurality of channels, the signal receiver operable to select one of the channels responsive to user input; an output section connected to the signal receiver, the output section operable to output a signal containing program service content from the channel selected by the signal receiver, wherein the signal is output to a display device that is configured to display the program service content; and a command execution module connected to the signal receiver and the output section, the command execution module operable to process a stream of user input from a headset, wherein the user input represents brainwave activity of a user who wears the headset, the command execution module further configured to compare the user input stream to one or more signal patterns to extract a user command and to execute the extracted user command.

Another embodiment is directed to a method of training a content receiver to recognize commands received from a headset, comprising: outputting an instruction from a content receiver, the instruction for the user to think a particular command that is executable by the content receiver; in response to outputting the instruction to the user, receiving a first input signal from a headset, the first input signal representing brainwave activity of the user acquired by the headset during a time frame following a display of the instruction; and in response to receiving the first input signal, storing the first input signal as a signal pattern at the content receiver, wherein the signal pattern is stored in correlation with the instruction output to the user.

Yet another embodiment is directed to a method of operating a content receiver, comprising: loading a user profile having one or more signal patterns for a user at a content receiver, each signal pattern comprising a brainwave pattern corresponding to a user's thought of a command executable by the content receiver; receiving a stream of user input from a headset at the content receiver, the stream of user input representing brainwave activity of a user who is wearing the headset; in response to receiving the stream of user input, comparing the user input stream to the one or more signals patterns to extract a user command, wherein the extracted user command has a brainwave pattern that substantially matches a portion of the user input stream; and in response to extracting the user command, executing the user command by the content receiver.

DETAILED DESCRIPTION

Embodiments discussed herein are directed to commanding a content receiver by receiving and analyzing brainwave patterns of a user of the content receiver. The user's brainwave patterns may be captured by a headset having a plurality of sensors disposed at various locations, such that these sensors are in proximity to the user's head when the headset is worn. The content receiver may learn to recognize specific brainwave patterns for individual users. Further, the content receiver may recognize a number of specific brainwave patterns for each user, each specific brainwave pattern corresponding to a specific command that is executable by the content receiver. When executing user commands, the content receiver may process an input stream from the headset and compare portions of the input stream to the recognized brain patterns in order to extract commands from the input stream. Following this, the extracted commands may be executed by the content receiver.

As used herein, a "receiver" may be any device capable of receiving video and/or audio content included in a broadcast or other content transmission from a service provider or other content source. Also as used herein, a "service provider" may include any service that provides a content transmission to a receiver such as, without limitation, a satellite television service, a direct television service or a cable television service, or a streaming video delivered across a network such as the Internet. It should be understood that the term "content transmission" generally embraces not only satellite or terrestrial broadcasts and/or narrowcasts but also transmission of information across any wired or wireless transmission medium. Accordingly, a "content service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Figure 1:
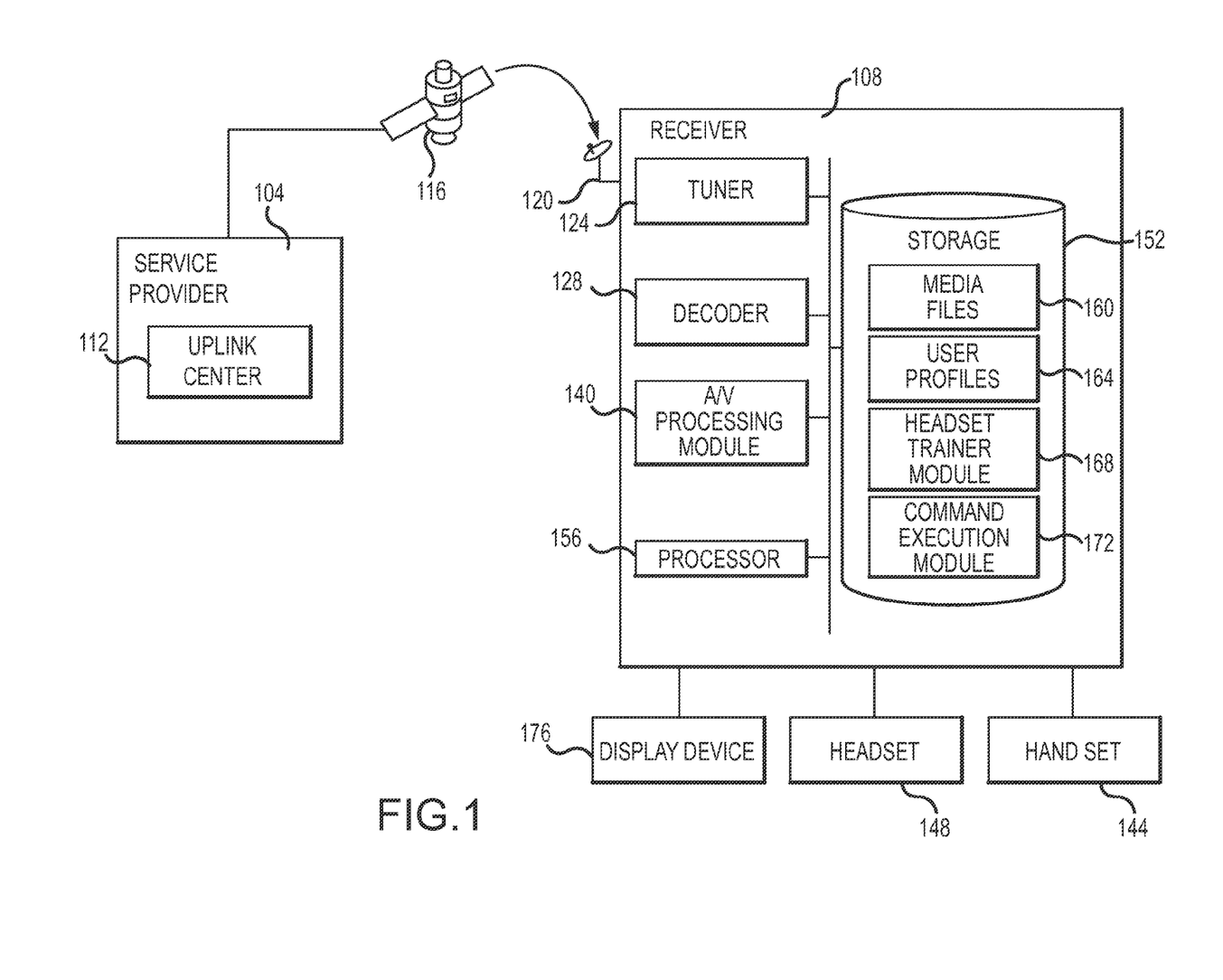
FIG. 1 is a schematic diagram showing a sample system, components and implementations discussed herein.

FIG. 1 is a schematic illustration of a general operating environment showing components and features of embodiments discussed herein. FIG. 1 depicts a service provider 104 that transmits or otherwise provides a content transmission to a receiver 108. The receiver 108 can include a set-top box (STB), a digital video recorder (DVR), a cable receiver, a general purpose computing device and so on. A receiver 108 may also include a cable modem that receives streaming audio. The receiver 108 may be associated with an individual, business or other entity, user or subscriber that receives a content transmission from the service provider 104. Generally the terms "user" and/or "subscriber" refer to an individual or company who receives a content transmission. This may include those who have purchased a subscription to the content transmission. Alternatively or additionally, the terms "user" and/or "subscriber" may refer to individuals who have been given access to the content transmission through promotional offers and/or other non-fee-based agreements.

In connection with embodiments that operate in the context of a satellite television service, the service provider 104 may provide a content transmission through an uplink center 112. Implementations discussed herein may utilize a direct broadcast satellite (DBS) system which can incorporate packetized transmission signals according to an appropriate standard, such as the MPEG-2 and/or MPEG-4 standards. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The retransmitted signal may be received from the satellite 116 at one or more satellite dishes 120, which are typically associated with one or more receivers 108. A receiver 108 may include a tuner 124 operable to receive the content transmission signal through the satellite dish 120 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (A/V) processing module 140. The A/V processing module 140 may process the video and audio streams using digital-to-analog conversion techniques, or compressed digital to uncompressed digital conversion techniques, to produce one or more output signals. It should be appreciated that the foregoing is but one discussion of a possible embodiment and product transmission service.

Again, it should be noted that embodiments may operate with different product transmission services. Accordingly, although a satellite system is provided as an example of a content transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet.

The receiver 108 may include or be associated with a memory or other storage device 152, such as magnetic or optical storage. The storage device 152 may be operable to store data received from the decoded satellite signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable in nature. The stored data set may include audio and/or visual content to be transmitted and output through the output device 176. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. In one embodiment, the storage device 152 may be used to store one or more media files 160 that have been placed in storage by a particular user. The media files 160 may include, for example, a library of favorite songs or videos, digital photographs, multi-media files, and the like. The storage device 152 may additionally include one or more user profiles 164. As described in greater detail below, the user profiles 164 may contain or more signal patterns that correspond to brainwave of patterns from a user that are correlated with specific commands executable by the receiver 108.

The receiver 108 may additionally include a processor 156 operable to run executable code in connection with various functions associated with the receiver 108. For example, the processor 156 may display graphics, images, animations or other content through the output device 176. The storage device 152 may store an application, file, or other data that is useable by the processor 156. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156.

Figure 2:
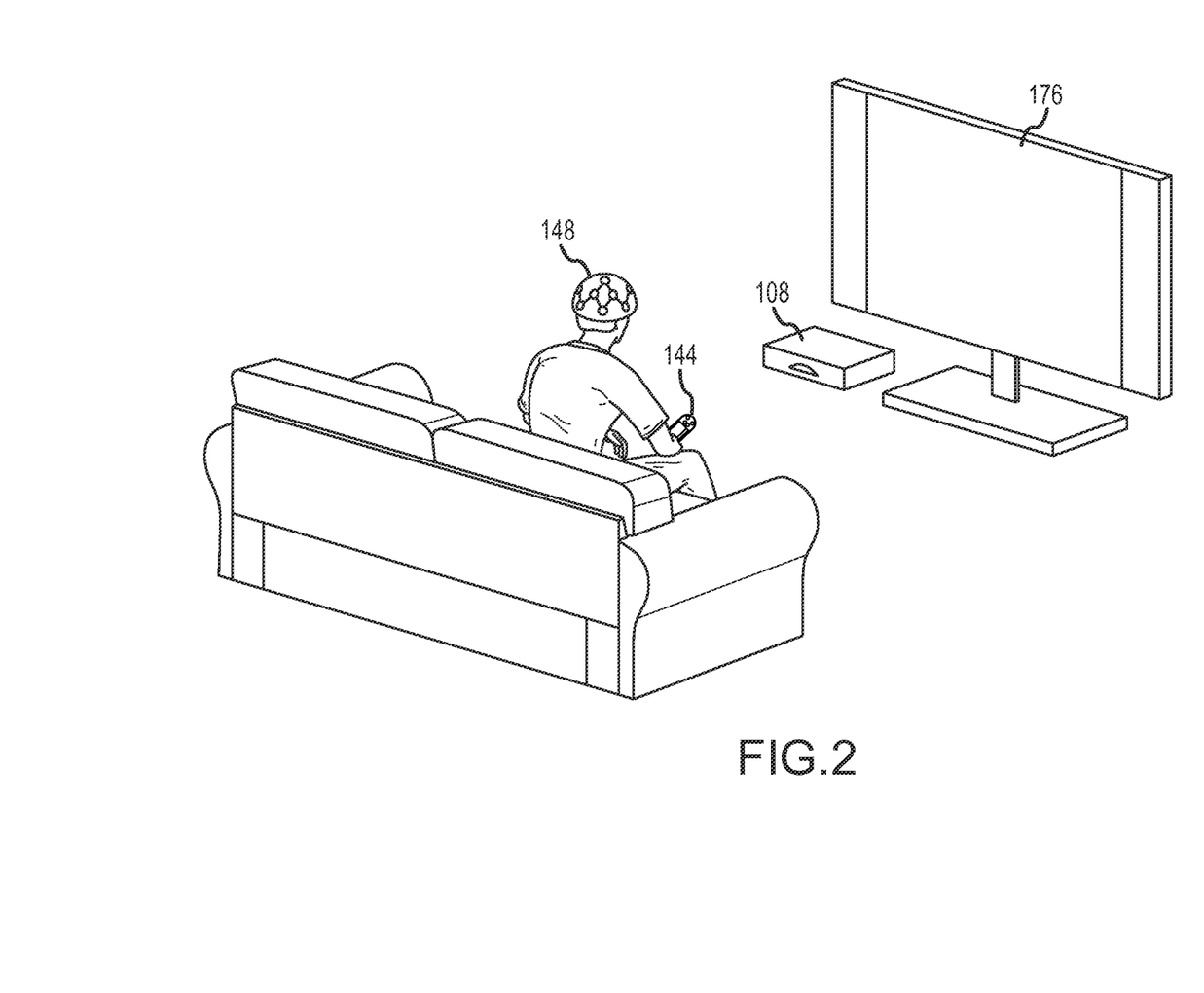
FIG. 2 is an illustration of the sample system depicted in FIG. 1 in operation in a sample environment.

The processor 156 may also perform such tasks as executing commands received from a user. As shown in FIG. 2, some user commands may be sent to the receiver 108 through a handset 144, such as remote or other wireless device. As used herein, a "user input device" may include any device operable to receive input from a user and to convey the input to the receiver 108. In one embodiment, the handset 144 may be a hand-held device having a number of buttons or keys that when actuated by a user cause the user input device to covey information to the receiver 108 using a suitable communication means, such as an infrared signal. The handset 144 may include a pointing device or functionality that allows the user to control the position of a cursor that is displayed on the output device 176. For example, the handset 144 may include a track ball or glide plane that may be manipulated to control cursor movements. The handset 144 may include a motion sensor or accelerometer that allows a user to control displayed items or graphics, such as a cursor, through movements of his or her hand or arm that cause a displacement of the handset 144. It should be appreciated that other input devices such as a computer mouse or touch screen may be used and other communication means, wired or wireless, may be used.

As shown in FIG. 2, commands or other input may be sent to the receiver 108 through the operation of a headset 148. The headset 148 may include a helmet or special hat that is adapted to be worn on the head of the user. The headset 148 may include a number of sensors that are arrayed within a frame or other structural portion of the headset 148. The sensors may disposed in selected locations within the frame that allow the sensors to sense brainwaves that are radiated, emitted or other detectable at or near the surface of the human head. The headset may employ electroencephalogram (EEG) or other related technology to measure the user's brain activity. Once the EEG signals are acquired, the headset 108 may digitize the data through analog-to-digital conversion techniques and then transmit the data to the receiver 108 through an appropriate wired or wireless connection. In accordance with other embodiments, the headset 148 may transmit an analog signal to the receiver 108 and analog-to-digital conversion may take place at the receiver 108.

The headset 148 may be provided in association with one or more processor executable modules that facilitate the operation of the headset 148 in connection with sending commands to the receiver 108. For example, referring again to FIG. 1, the storage device 158 may include a headset trainer module 168 and a command execution module 172. As described in greater detail below, the headset trainer module 168 may be operable to acquire and correlate certain brainwave patterns with user thoughts of specific commands that are executable by the content receiver 108. Additionally, the command execution module 172 may be operable to receive a stream of user input from the headset and to compare portions of the input stream to stored brainwave patterns to extract a command. Following this, the command execution module may execute the extracted command.

Figure 3:
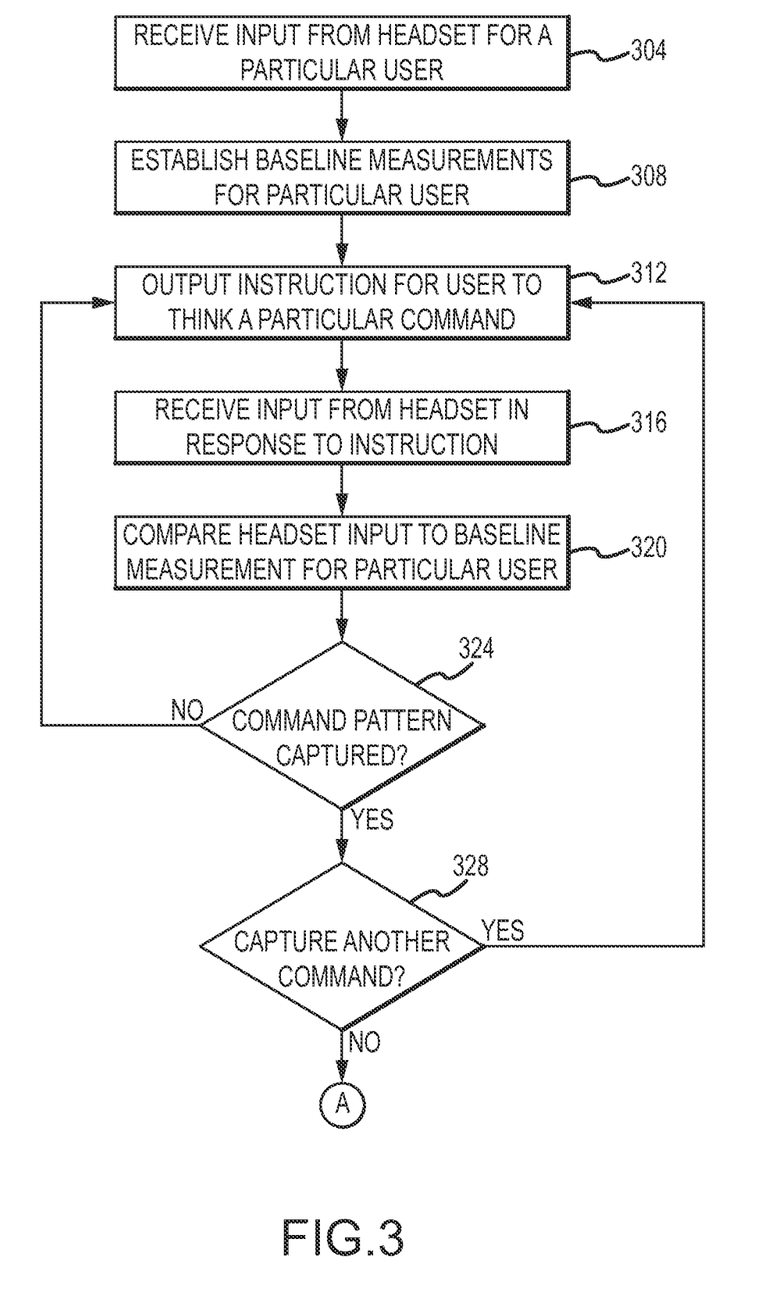
FIG. 3 is a flow chart that illustrates a first portion of a training method in accordance with embodiments discussed herein.

FIG. 3 is a flowchart that illustrates an operation of the headset trainer module 168. Initially, in operation 304, the headset trainer module 168 receives input from a headset for a particular user. In operation 304, the user wearing the headset 148 may identify himself, for example, by entering identification information through the use of the handset 144. If the user is disabled, an assistant may identify the user. The user may identify himself initially upon sending input to the headset trainer module 168 or, alternatively, may delay this process until training has taken place. If the user identifies himself later, the headset trainer module 168 may establish a default identity or placeholder identity which may then be replaced by user identification information. It should be appreciated that if there is only one user of the receiver 108 or headset 148, operation 304 may not be necessary. Following operation 304, operation 308 may be executed.

In operation 308, the headset trainer module 168 may establish baseline measurements for a particular user. Brainwave measurements indicative of a particular thought may vary from user to user. Accordingly, in some embodiments, operation 308 may be executed to establish characteristic brainwave measurements for a particular user that allow his or her brainwave measurements to be generally distinguished from other users. The various sensors disposed about the headset 148 may measure brain activity (e.g., brainwaves) and the strength of brain activity in various brain areas. By repeatedly measuring brain activity, including localized activity, strength, cycles/patterns and the like while a user repeatedly thinks the same thought, a baseline brainwave pattern may be determined. Following operation 308, operation 312 may be executed.

In operation 312, the headset trainer module 168 may output an instruction directing the user to think a particular command. In some embodiments, the headset 148 may be used for the purpose of moving a cursor from one point to another on the display device 144. In this embodiment, operation 312 may include outputting an instruction for a user to think about a particular direction such as "up," "down," "left," "right," and so on. Following operation 312, operation 316 may be executed.

In operation 316, the headset trainer module 168 may receive input from the headset 148 in response to the instruction given in operation 312. In one example, a user may think a particular direction such as "up," "down," "left," "right," while wearing the headset 148. Following this, the headset 148 may acquire signals or brainwaves and transmit an electrical representation of those brainwaves to the receiver 148 and thus to the headset trainer module 168. In connection with operations 312 and 316, the headset trainer module 168 may output an instruction directing the user to think the command at a particular instant in time. In so doing, the headset trainer module 168 may be allowed to more precisely determine which particular brainwave pattern corresponds to an intended command. Following operation 316, operation 320 may be executed.

In operation 320, the headset trainer module 168 may compare headset input received in operation 316 to the baseline headset measurements for the particular user acquired in operation 308. The headset trainer module 168 may make this comparison in order to more particularly identify which signal characteristic corresponds to an intended thought command and which signal characteristic represents background or other, unrelated thought processes. Following operation 320, operation 324 may be executed.

In operation 324, the headset trainer module 168 may determine, based on the comparison in operation 320, whether or not a signal pattern has been extracted from the input received in operation 312. Operation 324 may include the operation of the embodiment determining whether or not a signal pattern has enough distinctiveness to be recognized as a command pattern. If in operation 324, it is determined that no specific user input pattern has been acquired, operation 312 and the subsequent operations may again be executed in order to again attempt to acquire a signal pattern indicative of a particular command.

By contrast, if, in operation 324, a determination is made that a distinctive user input pattern has been acquired, operation 328 may be executed. In operation 328, the headset trainer module 168 determines if another signal pattern for an additional command should be acquired. Specifically, the headset trainer module 168 may be configured to attempt to acquire signal patterns for a number of commands, such as "up," "down," "left," "right," and so on. If, in operation 328, that list of commands is not yet complete, the embodiment may return to operation 312 and the next command in the list of commands maintained by the headset trainer module may be outputted to the user. However, if, in operation 328, the headset trainer module 168 determines that no further commands need to be associated with input signal patterns, an initial phase of user signal input patterns acquisition may end and the headset trainer module 168 may proceed to a second phase of its operation. In its second phase of operation, the headset trainer module 168 may proceed to test the functionality of the command signal patterns acquired in operations 304 through 324.

Figure 4:
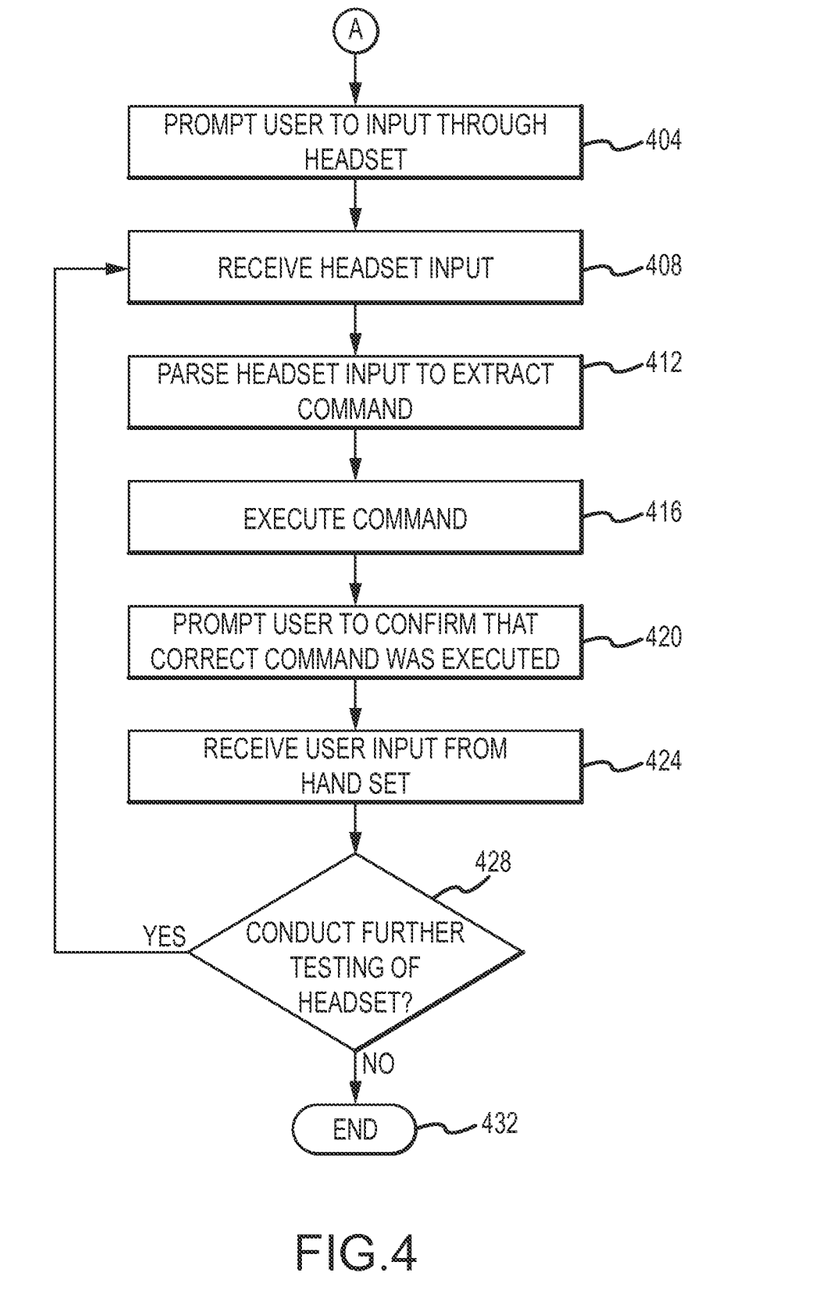
FIG. 4 is a flow chart that further illustrates a second portion of the training method in accordance with embodiments discussed herein.

FIG. 4 is a flowchart illustrating the second phase of operation for the headset trainer module 168, in which the headset trainer module 168 tests or confirms previously acquired user command signal patterns. In operation 408, which may be executed following operation 328, the headset trainer module 168 may prompt the user to input commands through the headset. In operation 404, the user may place the headset 148 on his head and proceed to think one or more commands for which he has previously provided input to the headset trainer module 168. Following operation 404, operation 408 may be executed.

In operation 408, the headset trainer module 168 may receive input from the user through the operation of the headset 148. Following this, the headset trainer module 168 may parse the headset input to extract a particular command in operation 412. Operation 412 may include comparing the headset input received in operation 408 to signal patterns identified previously by the headset trainer module 168 as corresponding to particular commands. In this regard, the headset trainer module 168 may sequentially move through a list of signal patterns and in each instance, compare the signal pattern with the input received in operation 408. Following operation 412, operation 416 may be executed.

In operation 416, the headset trainer module 168 may execute the command corresponding to the signal pattern which most closely matches the signal received in operation 408. Following operation 416, operation 420 may be executed. In operation 420, the headset trainer module 168 may prompt the user to confirm that the correct command was executed. It may be the case that the comparison of the user input received in operation 408 did not correctly identify the intended command which was input or attempted to be input by the user in operation 408. Accordingly, the headset trainer module 168 may output a request for confirmation message to the user. In one embodiment, the request for confirmation may be text displayed on the display device 144. In other embodiments, the request for confirmation message may include a voiced question output from a speaker portion of the set-top box or other appropriate mechanisms for conveying a question to the user. Following operation 420, operation 424 may be executed.

In operation 424, the headset trainer module 168 may receive user input in response to the command displayed or voiced or otherwise transmitted in operation 420. In one embodiment, the headset trainer module 168 receives input from the handset 144. In this embodiment, the user may input a yes or no response, for example, by selecting a particular popup or button on the screen or entering a particular number corresponding to his or her particular response. If the user is disabled, an assistant may respond to the request for confirmation message. Following operation 424, operation 428 may be executed.

In operation 428, the headset trainer module 168 may determine if confirmation of additional command signals patterns is required. Specifically, the headset trainer module 168 may confirm the operation of additional command signal patterns if not all command signal patterns have been confirmed. In this case, operation 408 may be executed following operation 428 in order to facilitate confirmation of further input signal patterns. If in operation 428, it is determined that the operation of all input signal patterns has been confirmed, the method may end in operation 432.

Figure 5A:
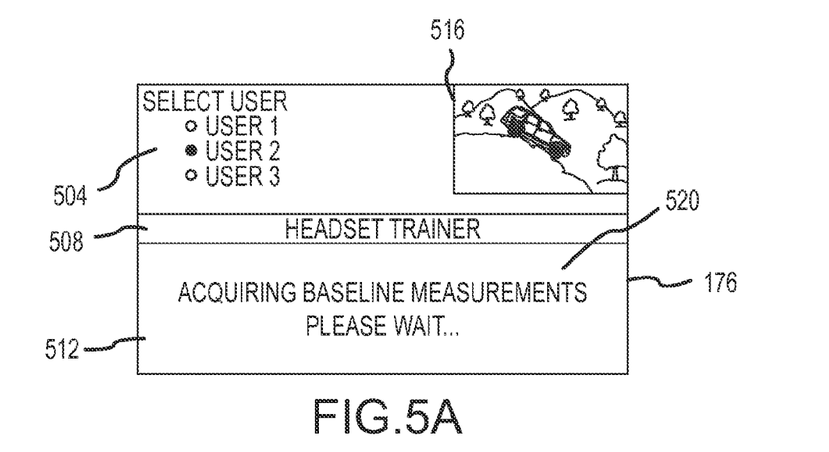
FIG. 5A-5C are illustrations of output from a display device in connection with the methods illustrated in FIG. 3 and FIG. 4.
Figure 5B:
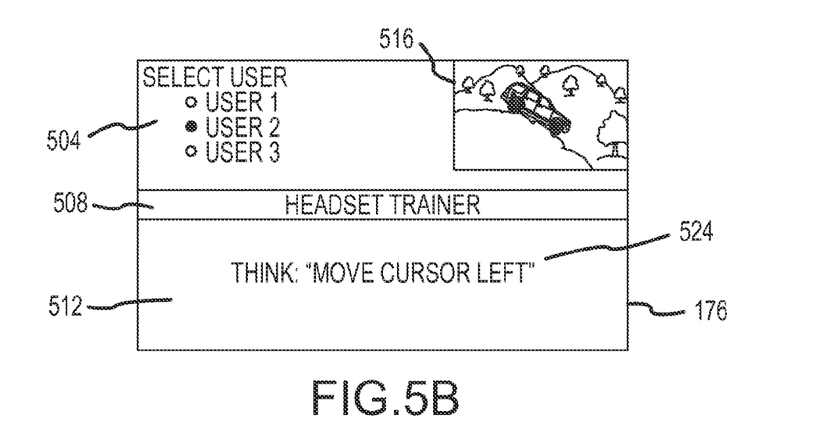
Figure 5C:
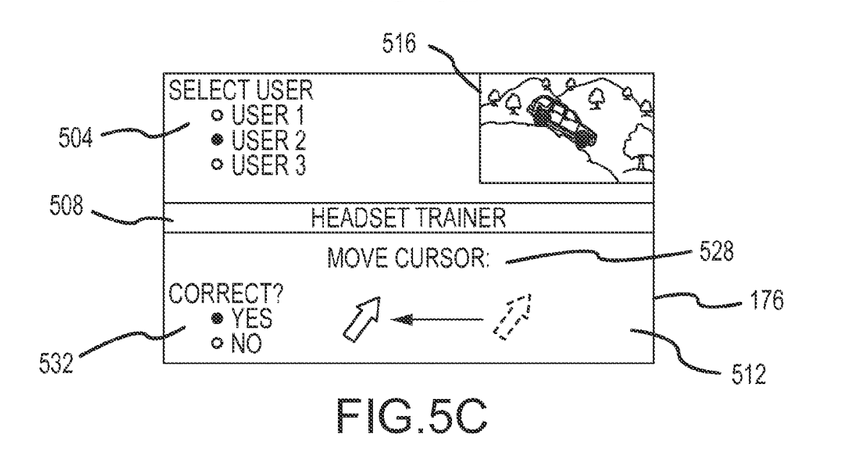

FIGS. 5A through 5C illustrate output from the display device 176 in connection with the operations of the headset trainer module 168 set forth in FIGS. 3 and 4. Specifically, FIGS. 5A through 5C illustrate output that may facilitate the training functions of the headset trainer module 168. FIGS. 5A through 5C include a user selection menu 504. As described above, the headset 148 may be used by one or more individuals and so in order to make the operation of the headset more effective, the headset trainer module 168 may keep track of which user is currently wearing the headset 148. This aspect of the headset trainer module 168 may be accomplished by the user selection menu 504 in which the user may be allowed to select himself from a list of other users through the operation of the handset 144. If the user is disabled, an assistant may make the selection. The outputs in FIGS. 5A through 5C may additionally include a banner 508 which indicates that the headset is being operated in training mode. The banner 508 may display a title such as, for example, "Headset Trainer". FIGS. 5A through 5C additionally include an interactive portion 512. The interactive portion 512 may be used to send prompts to, the user and/or to confirm the user's attempted command inputs. The headset trainer screen shown in FIGS. 5A through 5C may be implemented as a menu output by the receiver 508 which includes a portion dedicated to the normal program service content received from the satellite 116. Accordingly, FIGS. 5A through 5C include a miniaturized screen 516 in the corner of the display 176, having normal broadcast content.

FIGS. 5A through 5C illustrate various steps included in the methods illustrated in FIGS. 3 and 4. For example, the interactive portion 520 shown in FIG. 5A includes a message that the headset trainer module 168 is currently acquiring baseline measurements from the headset 148. The message 520 displayed in FIG. 5A may correspond to command 308 illustrated in FIG. 3. The command 524 illustrated in FIG. 5B may correspond to operation 312 wherein the headset trainer module 168 outputs a request to user to think a particular command. The message 524 prompts the user to think the command 'move cursor left'. Other commands may be implemented in this manner, such as 'move cursor right,' 'move cursor up,' 'move cursor down,' and so on. Testing of this command is illustrated by the output 528 shown in FIG. 5C. The output 528 corresponds to the operation 416 wherein the headset trainer module 168 has acquired a testing command and is executing the received command. As shown in FIG. 5C, the headset trainer module 168 has correlated user input with a command to move the cursor left and has executed this command on the display device 176. In response to the output 528, the user may confirm that the correct command was executed by selecting a yes menu item from a confirmation menu 432. FIG. 5C also depicts the motion of a cursor 536 in response to the mental command, from its initial position (shown as dashed lines) to its current position (shown in solid lines).

In certain embodiments, the trainer module may link a thought to a command by correlating the input signal from the headset to an input signal received from the handset. Specifically, the user may press a button on a remote while thinking the corresponding command, or thinking the command immediately before/after pressing the button. By correlating the two input signals, the trainer module may acquire an input signal pattern for use in executing commands.

Figure 6:
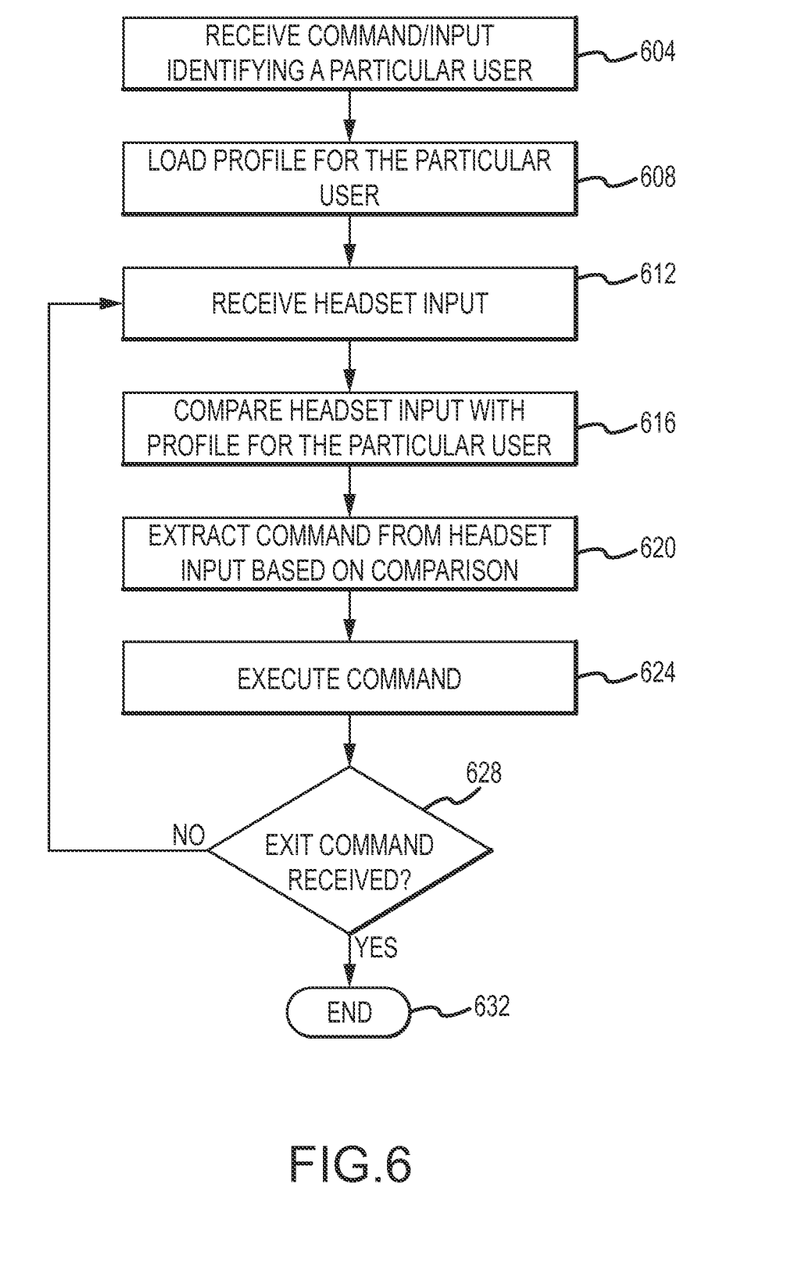
FIG. 6 is a flow chart that illustrates an operating method of an example embodiment.

FIG. 6 is an illustration of a method for operation of the command execution module 172. Initially, in operation 604, the command execution module receives input from a user identifying himself or herself, if necessary. In one embodiment, the user may identify himself through specific commands entered through a handset 144. If the user is disabled, an assistant may identify the user. Following operation 604, operation 608 may be executed. User identification may be optional in certain embodiments.

In operation 608, the command execution module 172 may load an appropriate user profile 164 that corresponds to the identified user. The user profile 164 may include a number of input signal patterns that have been correlated with specific thought commands of a particular user. As described above, these input signal patterns may be acquired and tested in accordance with the operation of the headset trainer module 168. Following operation 608, operation 612 may be executed.

In operation 612, the command execution module 172 may receive input from the headset 148. In operation 612, the receiver 108 may be functioning in a mode wherein the headset 148 continually monitors brainwave activity from the user and transmits that input to the receiver as it is acquired. Following operation 612, operation 616 may be executed.

In operation 616, the command execution module 172 may compare the input received in operation 612 with the user profile information loaded in operation 608. Specifically, the command execution module 172 may look for a match between the input and one or more characteristic signal patterns associated with a user. For example, the user profiles may have a characteristic signal indicating a "left," "right," "up," or "down" command. When a particular input signal matches one of those user profile characteristic signals, the command execution module 172 may interpret this as a user intending to think a particular command. Following operation 616, operation 620 may be executed.

In operation 620, the received command is extracted from surrounding input in response to the comparison made in operation 616. Specifically, the command execution module 172 may store that portion of the user input that matches one or more characteristic signal patterns. Following this, the extracted command may be executed in operation 624. Following operation 624, operation 628 may be executed. In operation 628, a determination is made if an exit command is received. Such a command may be entered to exit the mode of operation of the receiver 108 in which the headset 148 continually receives brainwave signals and transmits those signals to the receiver 108. Such a command may be entered through the operation of the handset 144, headset 148 or other appropriate user input device. If the exit command is not received in operation 628, operation 612 may be executed. Here, the headset 148 continues to acquire brainwave input. If in operation 628, an exit command is received, the method may end in operation 628.

Figure 7A:
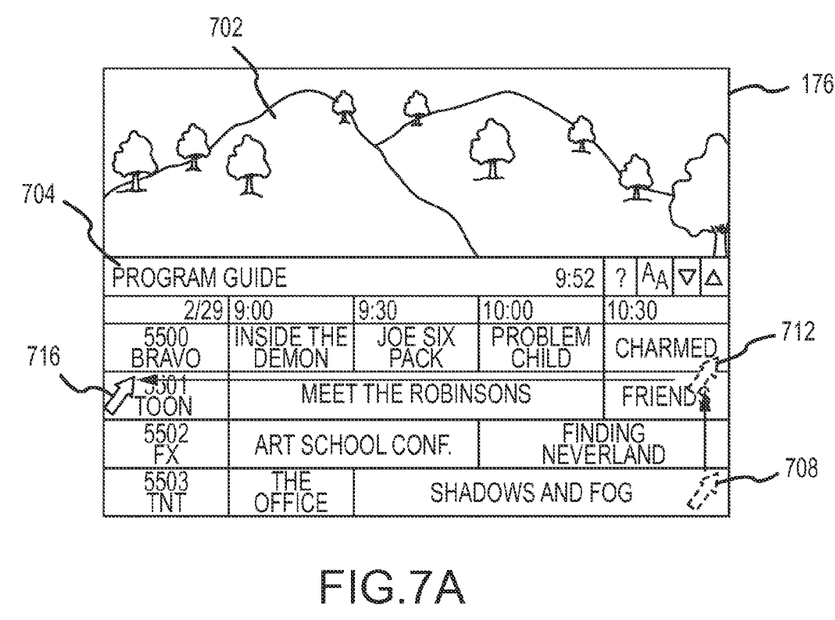
FIGS. 7A and 7B are illustrations of output from a display device in connection with the methods illustrated in FIG. 3 and FIG. 4.

FIGS. 7A through 7B illustrate various examples of the operation of the command execution module 172. In FIG. 7A, an electronic programming guide 704 (EPG) is displayed on the display device 176. As shown in FIG. 7A, EPG 704 may be overlain on top of a display 702 of program service content. The EPG 704 may be implemented as a grid in which time slots are indicated in vertical columns and particular channels are illustrated in the rows of a grid. Here, a user may select a particular television show provided on particular channel at a particular time. As shown in FIG. 7A, a cursor is moved about the screen to various locations within the EPG 704. Initially, the cursor begins in position 708 in the bottom right-hand corner of the display 176. In this position, the user may move the cursor by thinking a 'move cursor up' command. In response to receiving this command, the command execution module 172 may move the cursor to position 712. Following this, the user may input a command such as 'move cursor left'. In response, the headset trainer module 168 may move the cursor to the position 716 shown in FIG. 7A. In this way, the user may use the headset 148 to navigate to various positions in the EPG 704. In addition to directional commands, the user may think such commands as 'select' or 'enter' to select the particular channel shown in the EPG or to select a particular program, whereby the user may receive further information regarding the displayed program.

Figure 7B:
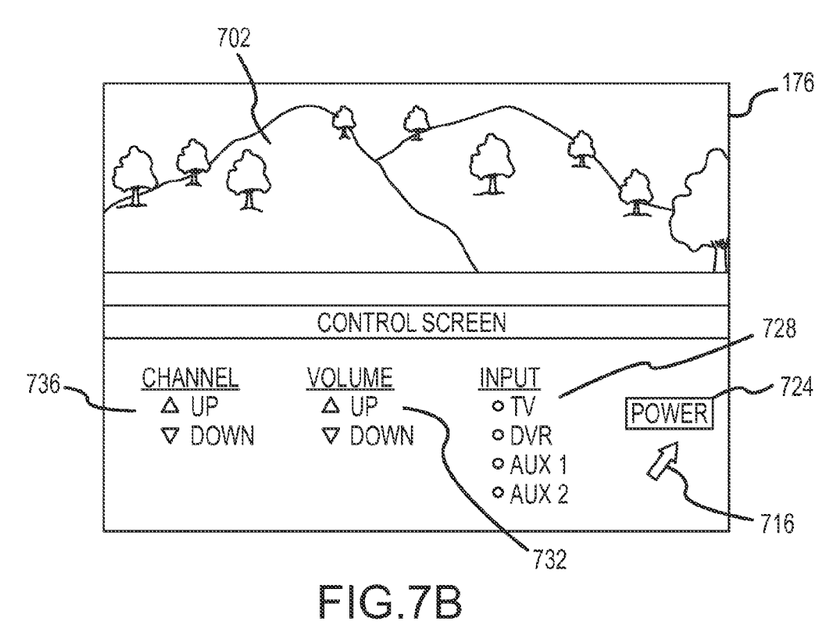

FIG. 7B is an illustration of a control menu in accordance with embodiments discussed herein. The control menu 702 may implement various functions which may or may not be typically associated with a handset 144. The control screen 720 may be overlain on top of normal program service content 702 displayed on a portion of the display device 176. The control screen 720 may include various items which the user may select through the operation of the headset 148 in order to accomplish various functions associated with the receiver 108. As shown in FIG. 7B, the control screen includes a power button 724. Here, the user may input various thought commands through the headset 148 to maneuver the cursor 716 on top of the power button 724 in order to turn off power to the receiver 108. Additionally, an input selection menu 728 may be used by the user to select a particular input such as "TV," "DVR," "Auxiliary 1," and "Auxiliary 2," and so on. In this way, the user may use the "Up," "Down," "Left," and "Right" and "Enter" commands to select certain commands or function set forth on the control screen 720. Alternative commands can be selected through drop down boxes that can be scrolled through or otherwise manipulated to select an appropriate selection. In this way, the receiver 108 may be operated with headset 148 without the need for using the handset 144.

The embodiments described above include specific directional commands that allow the user to move a cursor across a screen in order to selection certain items on the screen to thereby execute certain commands. Alternatively or in combination, the receiver 108 may be programmed to recognize commands that directly though by the user. For example, the receiver 108 may be programmed to recognize thoughts corresponding to a user's thoughts of one or more specific channels names or number. Specifically, the user may think "channel four" and the receiver may tune to channel four. Additionally, the user may recognize a set of commands like "channel changes," "page change," "select element," "yes/no," and the like.

In accordance with certain embodiments, a receiver 108 may be associated with multiple users using multiple headsets 148. Multiple headsets 148 may be used, for example, in the context of family viewing. In a multi-headset environment, priority may be given to certain users in the event that the receiver 108 receives multiple or conflicted headset 148 commands. In one instance, priority may be given to those users whose profiles identify them as adults. In this way, parents rather than children may retain control of the receiver and/or television.

In accordance with certain embodiments, input signal patterns for individual users that are saved into user profile 164 may be transferable to other receivers 108. In this way, new receivers would not need to be re-programmed to recognize user headset 148 commands.

While embodiments are discussed herein in connection with the exemplary satellite broadcast system shown in FIG. 1, it should be appreciated that embodiments may be used in connection other types of networks or content delivery mechanisms. Generally, the disclosure includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 3, FIG. 4 and FIG. 6, described herein is by way of example and limitation. Certain implementations may reorder method operations without departing from the spirit and scope of the disclosure.

The invention claimed is:

1. A method of training a content receiver to recognize commands received from a headset, comprising:
   acquiring, by a television receiver, baseline brain measurements of a user by repeatedly measuring brain activity of the user as the user repeatedly thinks the same thought over a historical time frame;
   outputting, by the television receiver, a first instruction for the user to think a particular command, wherein the command is executable by the television receiver, and wherein the first instruction for the user to think a particular command is displayable on a display device;
   receiving, at the television receiver, a first input signal from a headset, the first input signal representing brainwave activity of the user acquired by the headset during a first time frame following a display of the first instruction on the display device, wherein the first time frame is later in time than the historical time frame;
   storing, at the television receiver, the first input signal as a signal pattern, wherein the signal pattern is in correlation with the first instruction output to the user;
   analyzing the first input signal using the baseline brain measurements of the user to determine a plurality of commands associated with the user;
   outputting a second instruction for the user to think a test command, wherein the test command is one of the plurality of commands that are each stored in correlation with a particular brainwave pattern for the user, wherein the second instruction is different than the first instruction, and wherein the test command is different than the particular command;
   in response to outputting the second instruction to the user to think a test command, receiving a second input signal from the headset, the second input signal representing brainwave activity of the user acquired by the headset during a second time frame following a display of the second instruction on the display device, wherein the second time frame is later in time than the first time frame;
   in response to receiving the second input, comparing the second input signal to each particular brainwave pattern for the user stored at the television receiver to determine a candidate command, wherein the candidate command is correlated with a brainwave pattern that substantially matches the brainwave pattern of the second user input; and
   in response to determining the candidate command, executing, by the television receiver, the candidate command;
   prompting the user to indicate that the executed command correctly corresponds to the test command based on visual confirmation by the user of implementation of the executed command;
   in response to prompting the user, receiving a third input signal from the user, the third input signal indicating whether or not the executed command corresponds to the test command;
   retaining the brainwave pattern stored at the television receiver in correlation with the candidate command based on determining that the third input signal indicates that the executed command corresponds to the test command; and
   deleting the brainwave pattern stored at the television receiver in correlation with the candidate command based on determining that the third input signal indicates that the executed command does not correspond to the test command.

2. The method of training a content receiver of claim 1, wherein the third input signal is received from a hand-held device used by the user to confirm that the executed command correctly corresponds to the test command.

3. The method of claim 1, wherein the commands executable by the television receiver include direction commands operable to move a cursor to a desired location on a display device, the method further comprising:
   outputting an programming guide signal to the display device, the programming guide signal configured to cause the display device to display an electronic programming guide; and
   moving a cursor across the display device in response to a direction specified by the extracted user command.

4. The method of claim 3, further comprising:
   selecting a particular channel or program that is indicated by the cursors location.

5. The method of claim 1, further comprising:
   outputting a menu signal to the display device, the menu signal configured to cause the display device to display a control screen menu having one or more menu items selectable by a cursor to execute one or more function of the television receiver,
   wherein the commands executable by the television receiver include direction commands operable to move a cursor to a desired location on the display device and a selection command operable to select an item that corresponds to a location of the cursor.

6. The method of claim 5, wherein the control screen menu items include at least one of a power off selector, a input source selector, a volume selector, and a channel selector.

7. The method of claim 1, further comprising:
   receiving a fourth input, wherein the fourth input includes an indication that the user is no longer wearing the headset;
   receiving an indication that a second user has put on the headset;
   retrieving, based on an identification of the second user, a baseline brain measurements for the second user.

8. The method of claim 1, further comprising:
   in response to retaining the brainwave pattern stored at the television receiver in correlation with the candidate command, transmitting the brainwave pattern to a second television receiver.

9. The method of claim 8, wherein the television receiver and the second television receiver are connected to different networks.

10. A method of training a content receiver, comprising:
    loading, by a television receiver, a user profile, wherein the user profile is based on input received from a handheld handset communicatively connected with the television receiver, and wherein the user profile includes one or more signal patterns for a user at the television receiver, each signal pattern including a brainwave pattern corresponding to the user's thought of a command executable by the television receiver;

receiving, by the television receiver, a stream of user input from a headset at the television receiver, the stream of user input representing brainwave activity of a user who is wearing the headset;

in response to receiving the stream of user input, comparing, by the television receiver, the user input stream to the one or more signal patterns to extract a user command, wherein the extracted user command has a brainwave pattern that substantially matches a portion of the user input stream; and in response to extracting the user command, executing, by the television receiver, the user command;

outputting, by the television receiver, a first instruction for the user to think a particular command that is executable by the television receiver;

in response to outputting the first instruction to the user, receiving, by the television receiver, a first input signal from the headset, the first input signal representing brainwave activity of the user acquired by the headset during a time frame following a display of the first instruction;

in response to receiving the first input signal, storing, by the television receiver, the first input signal as a signal pattern at the television receiver, wherein the signal pattern is stored in correlation with the first instruction output to the user;

outputting, by the television receiver, a second instruction for the user to think a test command, wherein the test command is one of a plurality of commands that are each stored in correlation with a particular brainwave pattern for the user, and wherein the second instruction is different than the first instruction, and wherein the test command is different than the particular command;

in response to outputting the second instruction to the user to think a test command, receiving, by the television receiver, a second input signal from the headset, the second input signal representing brainwave activity of the user acquired by the headset during a time frame following a display of the second instruction;

in response to receiving the second input, comparing, by the television receiver, the second input signal to each particular brainwave pattern for the user stored at the television receiver to determine a candidate command, wherein the candidate command is correlated with a brainwave pattern that substantially matches the brainwave pattern of the second user input;

in response to determining a candidate command, executing, by the television receiver, the candidate command by the program receiver;

prompting the user to indicate that the executed command correctly corresponds to the test command based on visual confirmation by the user of implementation of the executed command;

in response to prompting the user, receiving, by the television receiver, a third input signal from the user, the third input signal indicating whether or not the executed command corresponds to the test command;

retaining, by the television receiver, the brainwave pattern stored at the television receiver in correlation with candidate command based on determining that the third input signal indicates that the executed command corresponds to the test command; and deleting, by the television receiver, the brainwave pattern stored at the television receiver in correlation with candidate command based on determining that the third input signal indicates that the executed command does not correspond to the test command.

11. The method of training a content receiver of claim 10, wherein the commands executable by the television receiver include direction commands operable to move a cursor to a desired location on a display device, the method further comprising:

outputting an programming guide signal to the display device, the programming guide signal configured to cause the display device to display an electronic programming guide; and moving a cursor across the display device in response to a direction specified by the extracted user command.

12. The method of training a content receiver of claim 11, wherein the commands executable by the television receiver include a selection command operable to select an item that corresponds to a location of the cursor, the method further comprising:

selecting a particular channel or program that is indicated by the cursors location if the extracted command is a selection command.

13. The method of training a content receiver of claim 10, further comprising:

outputting a menu signal to the display device, the menu signal configured to cause the display device to display a control screen menu having one or more menu items selectable by a cursor to execute one or more function of the television receiver;

wherein the commands executable by the television receiver include direction commands operable to move a cursor to a desired location on display device and a selection command operable to select an item that corresponds to a location of the cursor.

14. The method of training a content receiver of claim 13, wherein the control menu items include at least one of a power off selector, a input source selector, a volume selector, and a channel selector.

15. The method of claim 10, further comprising:

receiving a fourth input, wherein the fourth input includes an indication that the user is no longer wearing the headset;

receiving an indication that a second user has put on the headset;

retrieving, based on an identification of the second user, a brainwave pattern for the second user.

16. A non-transitory computer program product, tangible embodied in a non-transitory machine readable storage medium, including instructions operable to cause a data processing apparatus to:

acquire, by a television receiver, baseline brain measurements of a user by repeatedly measuring brain activity of the user as the user repeatedly thinks the same thought over a historical time frame;

output, by the television receiver, a first instruction for the user to think a particular command, wherein the command is executable by the television receiver, and wherein the first instruction for the user to think a particular command is displayable on a display device;

receive, at the television receiver, a first input signal from a headset, the first input signal representing brainwave activity of the user acquired by the headset during a first time frame following a display of the first instruction on the display device, wherein the first time frame is later in time than the historical time frame;

store, at the television receiver, the first input signal as a signal pattern, wherein the signal pattern is in correlation with the first instruction output to the user;

analyze the first input signal using the baseline brain measurements of the user to determine a plurality of commands associated with the user;

output a second instruction for the user to think a test command, wherein the test command is one of the plurality of commands that are each stored in correlation with a particular brainwave pattern for the user, wherein the second instruction is different than the first instruction, and wherein the test command is different than the particular command;

in response to outputting the second instruction to the user to think a test command, receive a second input signal from the headset, the second input signal representing brainwave activity of the user acquired by the headset during a second time frame following a display of the second instruction on the display device, wherein the second time frame is later in time than the first time frame;

in response to receiving the second input, compare the second input signal to each particular brainwave pattern for the user stored at the television receiver to determine a candidate command, wherein the candidate command is correlated with a brainwave pattern that substantially matches the brainwave pattern of the second user input; and in response to determining the candidate command, execute, by the television receiver, the candidate command;

prompt the user to indicate that the executed command correctly corresponds to the test command based on visual confirmation by the user of implementation of the executed command;

in response to prompting the user, receive a third input signal from the user, the third input signal indicating whether or not the executed command corresponds to the test command;

retain the brainwave pattern stored at the television receiver in correlation with candidate command based on determining that the third input signal indicates that the executed command corresponds to the test command; and delete the brainwave pattern stored at the television receiver in correlation with the candidate command based on determining that the third input signal indicates that the executed command does not correspond to the test command.

17. The non-transitory computer program product of claim 16, wherein the third input signal is received from a hand-held device used by the user to confirm that the executed command correctly corresponds to the test command.

18. The non-transitory computer program product of claim 16, wherein the commands executable by the television receiver include direction commands operable to move a cursor to a desired location on a display device, the non-transitory computer program product further comprising instructions configured to cause the data processing apparatus to:

output an programming guide signal to the display device, the programming guide signal configured to cause the display device to display an electronic programming guide;

move a cursor across the display device in response to a direction specified by the extracted user command; and select a particular channel or program that is indicated by the cursors location.

19. The non-transitory computer program product of claim 16, further comprising instructions configured to cause the data processing apparatus to:

output a menu signal to the display device, the menu signal configured to cause the display device to display a control screen menu having one or more menu items selectable by a cursor to execute one or more function of the television receiver, wherein the commands executable by the television receiver include direction commands operable to move a cursor to a desired location on the display device and a selection command operable to select an item that corresponds to a location of the cursor.

20. The non-transitory computer program product of claim 16, further comprising instructions configured to cause the data processing apparatus to:

receive a fourth input, wherein the fourth input includes an indication that the user is no longer wearing the headset;

receive an indication that a second user has put on the headset;

retrieve, based on an identification of the second user, a baseline brain measurements for the second user.

21. The non-transitory computer program product of claim 16, further comprising instructions configured to cause the data processing apparatus to:

in response to retaining the brainwave pattern stored at the television receiver in correlation with the candidate command, transmit the brainwave pattern to a second television receiver, wherein the television receiver and the second television receiver are connected to different networks.

* * * * *